United States Patent Office 3,636,197
Patented Jan. 18, 1972

3,636,197
JOSAMYCIN AND PRODUCTION THEREOF
Hamao Umezawa and Takashi Osono, Tokyo, Japan, assignors to Yamanouchi Pharmaceutical Co., Ltd., Tokyo, Japan
Continuation of application Ser. No. 462,307, June 8, 1965. This application Dec. 8, 1966, Ser. No. 600,274
Claims priority, application Japan, June 9, 1964, 39/32,400
Int. Cl. A61k 21/00
U.S. Cl. 424—121
14 Claims

ABSTRACT OF THE DISCLOSURE

Josamycin, a new antibiotic substance, is produced by culturing a strain of *Streptomyces narbonensis* var. *josamyceticus*. Josamycin is useful in the treatment of infections in animals, because it is effective in inhibiting the growth of Gram-positive bacteria.

---

Figure 1:
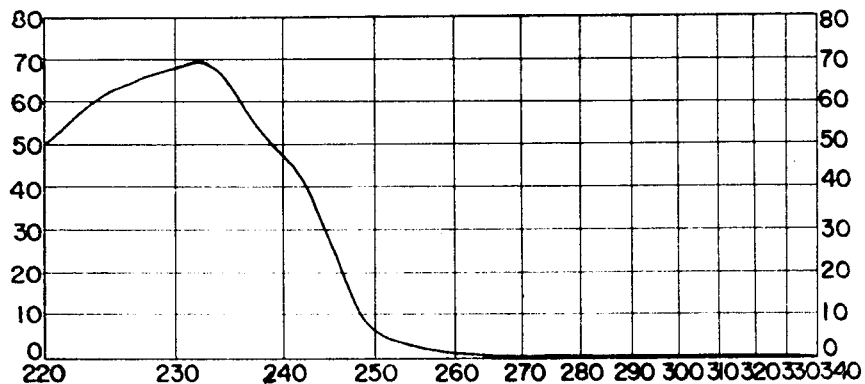

This application is a continuation of Ser. No. 462,307 filed June 8, 1965, now abandoned.

This invention relates to a new antibiotic, josamycin, and its salts, in the pure and the crude state and to their production and their isolation, especiallly their production by the culturing of microorganisms followed by extraction and isolation. The present invention provides josamycin in the form of its base or as acid addition salts, either in purified or crude state and either in solution or in the solid state. Josamycin inhibits the growth of Gram positive bacteria, has a low toxicity and is used for treatment of bacterial infections in animals.

There is thus now provided, according to the present invention, an antibiotic substance designated josamycin, and the acid addition salts thereof, effective in inhibiting the growth of Gram positive organisms. Josamycin takes the form of colorless needle crystals, having a melting point of 130–133° C., being silghtly soluble in water, being easily soluble in methanol, chloroform, ethyl acetate, and acetone; being soluble in benzene, ether, and carbon tetrachloride; being slightly soluble in petroleum ether, ligroin, and n-hexane; showing a maximum absorption at 232 m$\mu$ ($E_{1\,cm.}^{1\%}$ 320)

in methanol solution; showing a maximum absorption at 232 m$\mu$ ($E_{1\,cm.}^{1\%}$ 325)

in the solution in 0.001 N—HCl; showing bands at the following wave numbers when mixed with potassium bromide: 3480, 2960, 2930, 2880 (shoulder), 1734, 1627, 1452, 1374, 1297, 1234, 1165, 1120, 1080, 1050, 1020, 995, 936, 916, 855 and 837 cm.$^{-1}$; showing optical activity of $[\alpha]_D^{25}=-70°$ in 1% ethanol solution; having a p$K_a'$ of 7.1; containing carbon, oxygen, hydrogen and nitrogen; showing negative reaction in the qualitative test for halogen, sulfur, and phosphorus; showing red-purple color in an erythromycin test with sulfuric acid which changes to dark-purple by heating; showing orange-yellow color in phloroglucinol hydrochloric acid reaction; showing negative fuchsine-sulfite reaction, ferric chloride reaction, alkaline silver nitrate reaction, Fehling reaction, ninhydrin reaction, Millon reaction, biuret reaction, Molisch reaction and Elson-Morgan reaction; showing $R_f$ of 0.49 in paper chromatography using benzene-chloroform (1:1 in volume ratio); showing $R_f$ of 0.64 in thin layer chromatography using silica gel G and being developed with n-butyl alcohol-acetic acid-water (3:1:1 in volume ratio); inhibiting strongly staphylococci and other Gram positive bacteria; and having a low toxicity. Elementary analysis shows that josamycin contains C, 60.63%, H, 8.49%, N, 1.77% and O, 28.75%. The formula $C_{40}H_{68}NO_{14}$ is calculated for josamycin. As shown by the p$K_a'$ value, josamycin is a basic substance and forms water soluble hydrochloride, sulfate, tartrate and other acid salts.

Josamycin has the properties of the macrolide group of antibiotics, but is a novel antibiotic which is distinguished in properties from erythromycin, oleandomycin, leucomycin, spiramycin, tylosin, angolamycin, albomycetin, tetriomycin, methylmycin, picromycin and other known macrolide antibiotics.

In accordance with the present invention, a process is provided in which a culture medium containing nitrogen sources and carbon sources is inoculated with a josamycin-producing microorganism and the cultivation is continued until a substantial amount of josamycin is accumulated in the culture medium and thus-formed josamycin is recovered as the base or acid salt thereof in a crude or purified state.

The actinomyces producing josamycin has been for the first time isolated by the inventors, that is, the josamycin-producing microorganism, strain A 204–P$_2$, discovered by the inventors has been isolated from the soil at Motoyama, Nagaoka-gun, Kochi-ken, Japan. The organism has been deposited in the Department of Antibiotics, the National Institute of Health, Japan and the American Type Culture Collection where it has been assigned the Culture Number NIHJ 440 and ATCC No. 17835, respectively, and has been added to the permanent collection of microorganisms. The josamycin-producing microorganism, strain A 204–P$_2$, is classified as *Streptomyces narbonensis* var. *josamyceticus* and the following characters have been observed:

By microscopic observations, it has been confirmed that the strain belongs to a genus of streptomyces that stretches the aerial mycelium from the substrate mycelium of about one $\mu$ width and forms chains of spores at the top of the aerial mycelium. Neither whorls nor spirals are observed.

The said strain shows the following characteristics on various culture media:

(1) On a glycerol-nitrate-agar medium (glycerol-Czapek agar medium) at 27° C., the strain shows a cream-colored or slightly yellow-brown colored growth, and a powdery light brownish gray aerial mycelium is observed. No soluble pigment.

(2) On a dextrose-asparagine-agar medium (Krainsky dextrose-asparagine-agar medium) at 27° C., the strain shows a thin, yellowish brown growth. Other characteristics are the same as in (1).

(3) On a calcium malate-agar medium at 27° C., the strain shows a thin, yellowish brown growth but neither aerial mycelium nor soluble pigment is observed. Calcium malate around the growth is dissolved.

(4) In peptone water containing 0.2% $NaNO_3$ at 37° C., a colorless mycelium is formed, but neither aerial mycelium nor soluble pigment is formed. Nitrate is not reduced.

(5) On a starch-agar medium at 27° C., the strain shows a grayish yellow-brown growth; and aerial mycelium and pigment are hardly formed. Starch is hydrolyzed after 7 days of culturing, showing a hydrolyzed ring of 10 mm. in diameter, around the growth of 2.5 mm. in diameter by potassium iodide-iodine-starch reaction.

(6) On a tyrosine-agar medium at 27° C., the strain shows a colorless growth but aerial mycelium and soluble pigment are hardly formed.

(7) On a potato plug medium at 27° C., the strain shows a yellowish brown growth and forms white aerial mycelium slightly. The medium changes often to yellowish brown.

(8) On a carrot plug medium at 27° C., the strain shows a yellowish brown growth, and aerial mycelium and soluble pigment are hardly formed.

(9) On an egg medium at 37° C., the strain shows a colorless growth, and neither aerial mycelium nor soluble pigment is observed.

(10) On a blood-agar medium at 37° C., the strain shows a colorless growth, and neither aerial mycelium nor soluble pigment is formed. No hemolysis is observed.

(11) On a Loeffler coagulated serum medium at 37° C., the strain shows a colorless growth and neither aerial mycelium nor soluble pigment is formed. Liquefaction is not observed.

(12) On a gelatin medium at 18–20° C., the strain shows a cream-colored growth and no aerial mycelium is observed. A slight amount of a soluble yellowish brown pigment is sometimes formed. The liquefaction of gelatin is strong.

(13) In a skim milk medium at 37° C., a cream-colored ring growth is formed on the surface but no aerial mycelium is observed. Soluble pigment is not observed. Coagulation and peptonization are observed.

(14) On a cellulose (filter paper) medium at 27° C., the strain shows a colorless growth and neither aerial mycelium nor soluble pigment is formed. The cellulose is not decomposed.

(15) On a nutrient agar medium at 37° C., the strain forms yellowish brown growth slightly and neither aerial mycelium nor soluble pigment is formed.

(16) Utilization of carbon sources observed is as follows: When tested in a Pridham-Gottlieb's culture medium, raffinose, starch, dextrose, dextrin, xylose, maltose, sucrose, galactose levulose arabinose inulin and glycerol are utilized but inositol, mannitol, rhamnose, sorbitol, dulcitol, lactose and mannose are not utilized.

As shown above, the strain A 204–$P_2$ forms neither whorls nor spirals, shows no characteristic mycelium color, forms brown-gray aerial mycelia in some culture media, and forms no soluble pigment in synthetic and organic media. The strain belongs to the genus of streptomyces, and to a species which is a non-chromogenic type, showing a proteolytic action in a gelatin medium and in a milk medium, showing no tyrosinase reaction, not reducing nitrate, not decomposing cellulose, showing a starch-hydrolyzing action, and showing no hemolysis and no liquefaction of coagulated serum.

Among species belonging to the genus of streptomyces showing characteristics similar to the above-mentioned strain, it has been known that *Streptomyces felleus* and *Streptomyces narbonensis* produce macrolide antibiotics. However, *Streptomyces felleus* is different from the strain A 204–$P_2$ in the points that *Streptomyces felleus* grows well on a cellulose medium and reduces nitrates. As to *Streptomyces narbonensis*, it has been reported that the strain shows a blue-gray or red-gray growth on a potato medium. The strain A 204–$P_2$ is different from *Streptomyces narbonensis* in the above-mentioned point and further in the point that *Streptomyces narbonensis* is known to produce antibiotics belonging to the methymycin-narbomycin-picromycin group, all of which show a maximum ultraviolet absorption at 223–225 m$\mu$, while the strain A 204–$P_2$ produces antibiotics belonging to a group of macrolides different from the above group, e.g., those having a maximum ultraviolet absorption at 231–233 m$\mu$ such as spiramycin, tertiomycin, and leucomycin.

Hence, the strain A 204–$P_2$ is different from *Streptomyces narbonensis* and belongs to a novel variety of *Streptomyces narbonensis*, designated by the inventors *Streptomyces narbonensis* var. *josamyceticus*.

The *Streptomyces narbonensis* var. *josamyceticus* in this specification includes strain A 204–$P_2$ and all the natural and artificial variated strains thereof. In other words, it includes all the strains which produce josamycin and are not clearly distinguished from *Streptomyces narbonensis* var. *josamyceticus*.

On growing under suitable culturing conditions, the josamycin-producing strain produces josamycin. The culture medium containing josamycin is obtained by inoculating the spore or mycelium of a josamycin-producing strain into a suitable culture medium and by culturing under aerobic conditions. For the purpose of production of josamycin, solid culturing may be employed but in order to produce a large quantity of josamycin liquid, culturing is preferable. The culturing can be carried out at a temperature range in which the josamycin-producing strain can grow, but the range of 25–30° C. is preferred. As carbon sources in the culture medium for producing josamycin, glycerol, dextrose, levulose, maltose, sucrose, dextrin, starch, oils and fats can be used in a pure or crude state. As nitrogen sources for the production of josamycin, soybean meal, distillers' soluble, peanut meal, cotton seed meal, meat extract, peptone, fish meal, yeast extract, corn steep liquor, casein, casein hydrolyzate can be used. If necessary, inorganic nitrogen sources, such as nitrate or ammonium salt can be added and further sodium chloride, phosphate, magnesium salt, buffering agent such as calcium carbonate, etc. can also be added. If further necessary, a small amount of heavy metal salts can be added. The medium ingredients disclosed in Canadian Pat. 513,324, British Pats. 730,341 and 736,325 and U.S. Pats. 2,691,618, 2,658,018, 2,653,899, 2,586,762, 2,516,080, 2,483,892, 2,609,329 and 2,709,672 and all other known medium ingredients known for growing actinomycetes can be used in the present invention.

A known defoaming agent, such as liquid paraffin, oils and fats, and silicon resins can be used. Moreover, known culturing methods for producing antibiotics, such as penicillin, streptomycin, tetracycline, erythromycin, etc. can be applied in the present invention. Thus, the culturing is continued until a sufficient amount of josamycin is accumulated, usually for 2 to 5 days.

The culture and assay methods adopted in the present specification are as follows but it should be understood that the invention is not limited thereto:

SHAKING CULTURE METHOD

After sterilizing for 20 minutes at 120° C., 100 ml. (milliliters) of culture medium placed in a 500 ml. flask is inoculated with spores or mycelia of a josamycin-producing strain and shaking culture (130 strokes per min., amplitude 8 cm.) is carried out at 27–29° C.

TANK CULTURE METHOD

After 50 liters of a culture medium in a 100 liter stainless steel tank is sterilized for 20 minutes at 120° C., the culture medium is aerated at the rate of 50 liters/min. and stirred at 200 r.p.m. A silicone resin and a sesame oil are used for antifoam.

Production of josamycin in various culture media by shaking culture

| Run No. | Starch | Glucose | Soybean meal | Corn steep liquor | Meat extract | Peptone | Dipotassium hydrogen phosphate | Magnesium sulfate | Inorganic salt mixture[1] | Sodium chloride | Calcium carbonate | Cultivation pH | 3 days inhibition zone (mm.) | Cultivation pH | 4 days inhibition zone (mm.) | Cultivation pH | 5 days inhibition zone (mm.) |
|---|---|---|---|---|---|---|---|---|---|---|---|---|---|---|---|---|---|
| 1 | 2 | 1 | 1.5 | | | | 0.1 | 0.05 | | | | 6.4 | 23.4 | 7.0 | 24.3 | 7.0 | 24.6 |
| 2 | 2 | 1 | 1.5 | | | | 0.1 | 0.05 | | | | 6.8 | 23.5 | 7.0 | 23.8 | 6.6 | 24.5 |
| 3 | 2 | 1 | 1.5 | | | | 0.1 | 0.05 | | | | 5.8 | 23.0 | 7.0 | 23.7 | 7.0 | 24.0 |
| 4 | 2 | 2 | 1.5 | | | | 0.2 | | | | | 6.2 | 22.3 | 6.2 | 24.0 | 6.2 | 25.1 |
| 5 | 2 | 2 | 1.5 | | | | 0.2 | | | | | <5.8 | 23.2 | <5.8 | 25.0 | 5.8 | 26.1 |
| 6 | 2 | 2 | 1.5 | | | | 0.2 | | | | | <5.8 | 22.0 | 5.8 | 24.7 | 6.4 | 24.3 |
| 7 | 1 | 2 | 3 | | | | 0.1 | 0.05 | | | | 6.4 | 24.1 | 7.4 | 23.1 | 7.4 | 24.3 |
| 8 | 1 | 2 | 1 | | | | 0.1 | 0.05 | | | | <5.8 | 23.7 | 6.2 | 23.9 | 6.8 | 26.1 |
| 9 | 2 | 2 | 1 | | | | 0.1 | 0.05 | | | 0.3 | <5.8 | 22.7 | 6.6 | 23.6 | 6.8 | 23.7 |
| 10 | 2 | 2 | 1 | | | 0.25 | 0.1 | 0.05 | | | 0.3 | <5.8 | 22.1 | 6.6 | 23.8 | 6.6 | 26.1 |
| 11 | 1 | 2 | 1.5 | | | 0.25 | 0.1 | 0.05 | | | 0.3 | <5.8 | 21.7 | <5.8 | 23.2 | <5.8 | 24.5 |
| 12 | 2 | 2 | 1.5 | | | 0.25 | 0.1 | 0.05 | | | 0.3 | <5.8 | 22.1 | 5.8 | 23.7 | 5.8 | 24.1 |
| 13 | 2 | 1 | 1.5 | | | 0.25 | 0.1 | 0.05 | | | 0.3 | 6.2 | 21.3 | 5.8 | 23.3 | 5.8 | 26.2 |
| 14 | 2 | 2 | 1 | | | 0.5 | 0.1 | 0.05 | 0.4 | | 0.3 | <5.8 | 21.4 | 6.2 | 23.6 | 6.6 | 23.1 |
| 15 | 1 | 2 | | | 0.5 | 0.5 | 0.1 | 0.05 | | | 0.3 | <5.8 | 22.7 | 6.4 | 22.4 | 6.2 | 23.1 |
| 16 | 2 | 2 | | | 0.5 | 0.5 | 0.1 | 0.05 | | | 0.3 | 6.2 | 21.1 | <5.8 | 22.4 | <5.8 | 24.1 |
| 17 | 2 | 2 | | | 1 | 1 | 0.1 | 0.05 | | | 0.3 | <5.8 | 18.0 | <5.8 | 21.5 | <5.8 | 23.6 |
| 18 | 2 | 2 | | | 1 | 1 | 0.2 | 0.05 | | | 0.3 | <5.8 | 15.4 | <5.8 | 21.5 | 5.8 | 22.3 |
| 19 | 2 | 2 | | | 1 | 1 | 0.3 | 0.05 | | | 0.3 | <5.8 | 20.4 | <5.8 | 22.3 | 6.0 | 23.9 |
| 20 | 2 | 2 | | | 1 | 0.5 | 0.2 | | | | 0.3 | 6.0 | 24.2 | 7.0 | 21.8 | 6.0 | 23.1 |
| 21 | 2 | 2 | | | 2 | 2 | 0.2 | | | | 0.3 | 6.0 | 24.8 | 6.4 | 21.8 | 6.8 | 23.1 |
| 22 | 2 | 2 | 1.5 | | 2 | 1 | | | | | 0.3 | 6.4 | 21.7 | 6.4 | 23.3 | 6.4 | 26.0 |
| 23 | 2 | 2 | | 1.5 | | | | | | | 0.3 | 6.6 | 22.3 | 6.4 | 22.8 | 6.8 | 24.9 |
| 24 | 2 | 2 | | 1.5 | | 0.5 | | | | | 0.3 | 6.6 | 22.7 | 5.8 | 21.6 | <5.8 | 25.0 |
| 25 | 2 | 2 | | 1 | | 1 | 0.2 | | | | 0.3 | 6.6 | 22.6 | 6.4 | | 6.2 | 24.7 |
| 26 | 2 | 2 | | | | 1 | 0.2 | | | | 0.3 | <5.8 | 16.6 | <5.8 | 24.0 | <5.8 | 26.4 |
| 27 | 2 | 2 | | | | 2 | 0.2 | | | | 0.3 | 6.2 | 18.6 | 6.2 | 17.0 | 6.2 | 19.5 |
| 28 | 2 | 2 | 1 | | | 1 | 0.2 | | | | 0.3 | 6.8 | 21.9 | 6.4 | 23.9 | 6.8 | 23.9 |
| 29 | 2 | 2 | | 1 | | 0.5 | 0.5 | | | | 0.3 | 6.2 | 21.2 | 5.8 | 23.8 | 5.8 | 24.4 |
| 30 | 2 | 2 | | 1 | | 1 | 0.25 | | | | 0.3 | 5.8 | | | | | |

[1] The inorganic salt mixture in table has the following ingredients: $MgSO_4$ 100 g., $CuSO_4 \cdot 5H_2O$ 0.5 g., $FeSO_4 \cdot 7H_2O$ 20 g., $MnSO_4 \cdot 5H_2O$ 0.4 g., $ZnSO_4 \cdot 7H_2O$ 1.0 g., $CoCl_2 \cdot 6H_2O$ 0.1 g., conc. hydrochloric acid 1.0 ml., distilled water 1,000 ml.

ASSAY FOR JOSAMYCIN

A cylinder plate method is applied and the procedure is the same as that for penicillin determination.

Josamycin-producing strain A 204–P₂ is first subjected to the shaking culture using a medium containing 1.5% soybean meal, 1.0% glucose, 1.0% starch, 0.3% sodium chloride, 0.1% dipotassium hydrogen phosphate, and 0.05% magnesium sulfate (pH 6.4, non-adjusted) at 28° C. for four days. (Percentages throughout this specification are percentages by weight.) When the culture fluid obtained at 3 days culture was tested, the inhibition zone of 22 mm. was observed.

The results of runs testing the production of josamycin in various carbon and nitrogen sources by a strain obtained by monospore culture from the strain A 204–P₂ are shown in the table.

As shown in the table, starch and glucose are examples of suitable carbon sources and meat extract, peptone and soybean meal are examples of suitable nitrogen sources. A culture medium containing 1.5% of soybean meal, 1.0% of starch, 1.0% of glucose, 0.3% of sodium chloride, 0.1% of dipotassium hydrogen phosphate, and 0.05% of magnesium sulfate (pH non-adjusted) is an example of culture medium suitable for the production of josamycin. When the culturing was carried out in a 100 liter tank using the above culture medium for 40 hours, the pH of the medium became 6.4, and by the cylinder plate method using Bacillus subtilis, an inhibition diameter of 25 mm. was observed on the culture filtrate. The pH value for the maximum production of josamycin is influenced by the composition of culture media used. A high production of josamycin is obtained by selecting strains of a high productivity by monospore culture, ultraviolet irradiation, X-ray irradiation, treatment with mutagenic substances and by selecting a culture medium and culture conditions suitable for the production of josamycin by each strain.

Josamycin in the cultured broth is present both in the liquid portion and in the solid portion containing mycelia. Where the production power is high and the pH of the culture fluid is neutral or alkaline, josamycin exists also in the solid portions, while where the culture fluid is acid, josamycin mainly exists in the liquid portion.

In order to isolate josamycin from the liquid portion, the culture fluid is separated into a liquid portion and a solid portion by a conventional means, such as filtration or centrifugation. Josamycin in the aqueous solution can be extracted at a neutral or weak-alkaline reaction with an organic solvent, such as butyl acetate, ethyl acetate, chloroform, methyl isobutyl ketone, butyl alcohol and others, which is immiscible with water and in which josamycin is more soluble than in water. Josamycin can be directly extracted from the cultured broth containing mycelia with an organic solvent without separating the solid portion from the liquid portion. Josamycin in the solid portion containing mycelia can be extracted with an acid aqueous solution or a solvent in which josamycin or the acid salts thereof are soluble. Josamycin thus extracted into an organic solvent is then transferred into acid water. Further, josamycin can be precipitated from an aqueous solution of the acid salt by adjusting the pH of the aqueous solution to neutral or weak-alkaline.

Josamycin can also be adsorbed on an activated carbon from the aqueous solution thereof, e.g. from the culture fluid. The adsorbed josamycin can then be eluted with acid water or alcohols, acetone and other organic solvents in which josamycin is soluble. Josamycin has a weak-basic character and is adsorbed on ion-exchangers such as ion-exchange resins and cellulose ion-exchangers when the aqueous solution of josamycin is treated with such an ion-exchanger.

Josamycin extracted in a suitable organic solvent, such as ethyl acetate, chloroform, butyl alcohol, acetone, methyl alcohol and other organic solvents can be concentrated by evaporation under vacuum. In this case, the pH of the system is preferably at a neutral or weak-acid reaction at which josamycin is stable, and if necessary a flash evaporation or spray drying can be utilized as the evaporation method.

Impurities can be removed from a crude powder of josamycin by dissolving it in an organic solvent for josamycin, such as ethyl alcohol, ethyl acetate, or benzene or by washing it with an organic solvent in which josamycin is not soluble, such as petroleum ether or n-hexane. Moreover, the removal of impurities can be promoted by precipitating josamycin from josamycin-containing organic solvent by addition of an organic solvent such as petroleum ether or n-hexane in which josamycin is not soluble. Further, josamycin in the organic solvent can be separated from impurities by utilizing the difference of adsorptive powers of various adsorbents. For example, by adsorbing josamycin on alumina followed by elution with acetone or ethyl acetate, highly purified josamycin can be obtained. Josamycin thus purified is effective in complete protection of the infection of mouse with *diplococcus pneumoniae* by three introperitoneal injections of 0.25 mg. per mouse.

For further purification of josamycin, countercurrent distribution methods and chromatographic methods can be utilized. For example, after adsorbing on alumina, josamycin can be eluted with ethyl acetate. Also, after adsorbing josamycin on a weak-acid ion-exchange resin or silica gel, josamycin can be eluted and purified. Pure josamycin can be obtained from thus-eluted josamycin by vacuum-evaporation of the solvent and recrystallization from benzene or toluene. When the yield of josamycin in the culture fluid is high, josamycin can be recovered as the crystal without applying means such as chromatographic methods and countercurrent distribution.

Josamycin has a weak basic character and is soluble in various organic solvents and acid water, but not soluble in neutral water, petroleum ether, n-hexane, etc., and based on these properties, josamycin can be recovered in a crude or pure state by removing a part of or all the impurities by applying conventional means, such as dissolution, precipitation, adsorption, elution, distillation, drying, washing, dialysis and extraction.

Josamycin is obtained from benzene as colorless needle crystals having a melting point of 108–113° C., which are, when completely dried, converted into white needle crystals having a melting point of 130–133° C.; easily soluble in chloroform, methanol, ethanol, acetone, ethyl acetate, and acidic water; soluble in ether, benzene, and carbon tetrachloride; slightly soluble in neutral water, petroleum ether, petroleum benzin, ligroin, and n-hexane; and its $pH_a'$ is 7.1 when electrometrically titrated in a methanol water (4:6 in volume ratio).

Figure 2:
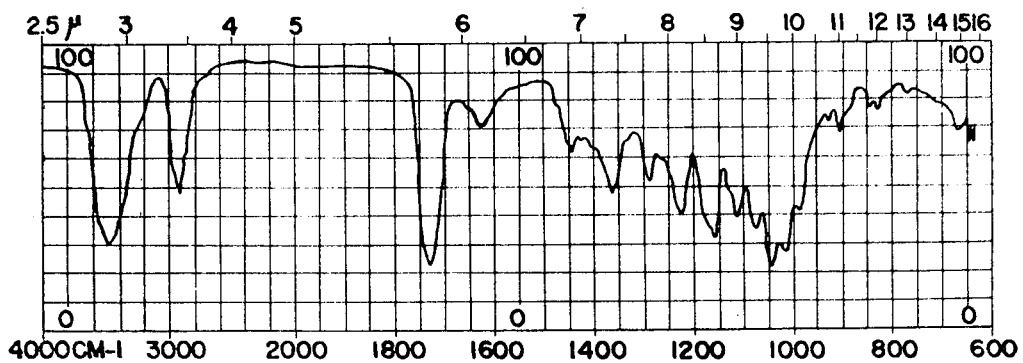
Figure 3:
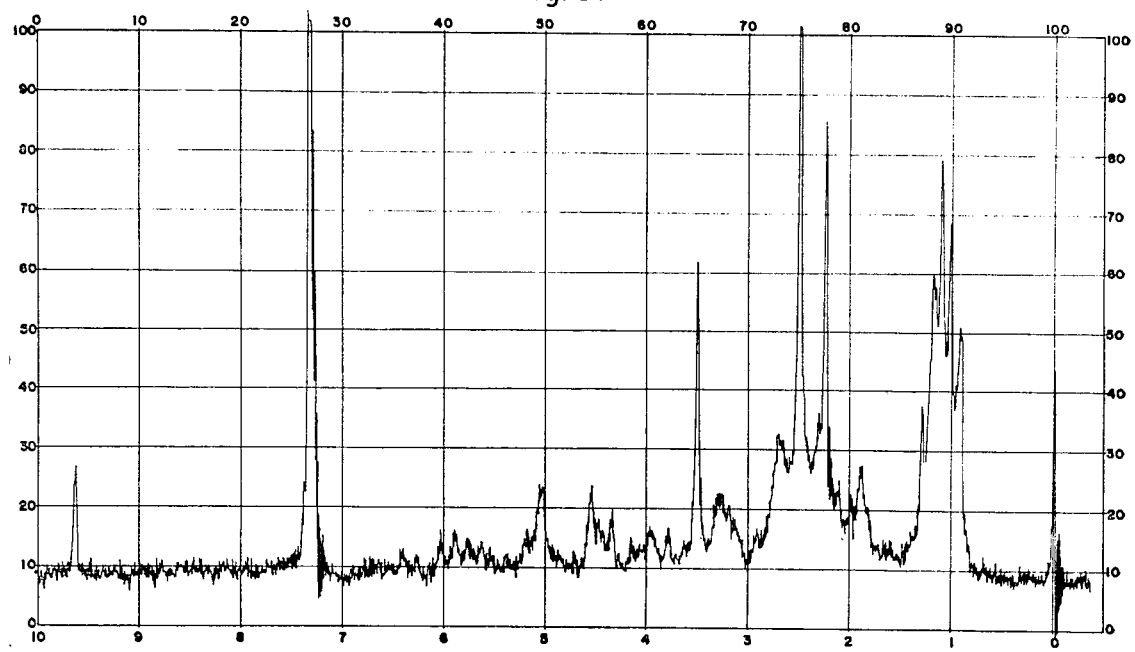

As shown in FIG. 1 of the accompanying drawings, josamycin shows a maximum absorption $$(E^{1\%}_{1\,cm.} = 325)$$

at 232 mμ in the ultraviolet absorption spectra measured in a $\frac{1}{1000}$ N aqueous hydrochloric acid solution. When measured in a methanol solution, a maximum absorption $$(E^{1\%}_{1\,cm.} = 320)$$

is observed at 232 mμ. The infra-red absorption spectrum obtained for josamycin mixed with potassium bromide is shown in FIG. 2 in which josamycin shows absorption bands at 3480, 2960, 2930, 2880 (shoulder), 1734, 1627, 1452, 1374, 1297, 1234, 1165, 1120, 1080, 1050, 1020, 995, 936, 916, 855 and 837 cm.$^{-1}$. Josamycin shows red-purple color in an erythromycin test with sulfuric acid, which changes to dark purple by heating, and orange-yellow color in pholoroglucinol-hydrochloric acid reaction, which shows josamycin as being positive to these tests, while it shows negative fuchsine-sulfite reaction, ferric chloride reaction, alkaline silver nitrate reaction, Fehling reaction, ninhydrin reaction, Millon reaction, biuret reaction, Molisch reaction and Elson-Morgan reaction. Josamycin is optically active and the specific rotation $[\alpha]_D^{25}$ is $-70°$ (c.=1% in ethanol). N.M.R. spectrum of josamycin taken by Hitachi MNH-1 type equipment is indicated in FIG. 3.

An elemental analysis shows (percent):

C = 60.63,
H = 8.49,
N = 1.77 and
O = 28.75, and by a qualitative test, sulfur, halogen, and phosphorus are not detected. By titration, a value of 865 is obtained as acid equivalent but the molecular weight obtained by Rast's method is 461. However, the nitrogen value obtained by an elemental analysis shows that the real molecular weight is near the acid equivalent value and then, though it is not decisive, the formula of josamycin is calculated to be $C_{40}H_{68}NO_{14}$. Josamycin shows $R_f$ of 0.49 in a paper chromatography using a solvent mixture of benzene-chloroform (1:1 in volume ratio), $R_f$ of 0.64 in thin layer chromatography using silica gel and developing as high as 10 cm. with a solvent mixture of n-butanol-acetic acid-water (3:1:1 in volume ratio), and $R_f$ of 0.66 in thin layer chromatography using alumina and developing with ethyl acetate.

Josamycin inhibits the growth of Gram positive bacteria such as staphylococci at a concentration of 0.2 to 1.5 μg./ml. and inhibits also the growth of staphylococci resistant to streptothricin, telomycin, streptomycin, chloramphenical, or penicillin.

The antibacterial spectrum of josamycin is shown in the following table:

ANTIBACTERIAL SPECTRA OF JOSAMYCIN

| Organism: | Inhibitory concentration (μg./ml.) |
|---|---|
| *Bacillus megatherium* 10778 | 0.39 |
| *Bacillus megatherium* APF | 0.39 |
| *Bacillus cereus* | 0.39 |
| *Bacillus agri* | Below 0.01 |
| *Bacillus subtilis* PCI 219 | 0.19 |
| *Sarcina lutea* PCI 1001 | 0.02 |
| *Micrococcus flavus* | 0.05 |
| *Staph. aureus* Terajima | 0.78 |
| *Staph. aureus* Smith | 0.78 |
| *Staph. aureus* FDA 209P | 0.39 |
| *Staph. citreus* | 0.39 |
| *Mycobacterium* 607 | 3.1 |
| *Mycobacterium phlei* | 3.1 |
| *E. coli* O-1 | Above 50 |
| *S. cholerae-suis* S-34 | 6.3 |
| *S. typhi* H 901 W | Above 50 |
| *S. enteritidis* S-64 | Above 50 |
| *Sh. flexneri* Ew-10 | Above 50 |
| *Sh. sonnei* Ew-34 | Above 50 |
| Staphylococci resistant to | |
| Streptothricin | 0.78 |
| Amphomycin | 0.39 |
| Penicillin | 0.39 |
| Actinomycin | 0.39 |

Organism: Inhibitory concentration (μg./ml.)
Staphylococci resistant to
- Erythromycin _____ 25
- Carbomycin _____ Above 50
- Telomycin _____ 0.39
- Streptomycin _____ 0.63
- Chloramphenicol _____ 1.56

Josamycin effectively protects animals against infections with staphylococci. Thus, as shown in the examples of this invention, two intraperitoneal injections of 0.25 mg. each of josamycin (powder of 90% purity) completely protect a mouse against infection with staphlococci (Smith strain). Josamycin also protects animals against infection with *Diplococcus pneumoniae*. Thus, three intraperitoneal injections of 0.25 mg. each of josamycin completely protect a mouse against infection with *Diplococcus pneumoniae* (Type III).

When 250 mg./kg. of josamycin is intravenously injected, mice survived without side reaction.

As mentioned above, josamycin has a low toxicity, cures the infections of animals with staphylococci and *Diplococcus pneumoniae*.

Josamycin having the above-mentioned characteristics is a macrolide antibiotic. It is necessary to distinguish josamycin from macrolide antibiotics having the maximum ultraviolet absorption near 232 mμ. As the macrolides having the maximum near 232 mμ like josamycin, there have been known, spiramycin (foromacidin), leucomycin, miamycin, tertiomycin, and substance No. 446.

As shown below, josamycin is a novel antibiotic that can be clearly distinguished from spiramycin by thin layer chromatography on silica gel using as the developing solvent n-butanol-acetic acid-water (3:1:1 in volume ratio) and by its very high nitrogen content; from leucomycin $A_1$ by thin layer chromatography on alumina using as the developing solvent ethyl acetate; from leucomycin $A_2$ and leucomycin B group, miamycin, tertiomycin, and substance No. 446 by melting points and from leucomycin $A_2$ by $$E_{1\,cm.}^{1\%}$$

value at ultraviolet absorption maximum, and low nitrogen content. According to Japanese patent publication No. 98/1961, leucomycin $A_1$ has a melting point of 135–138° C., a maximum absorption at 232–233 mμ

$$(E_{1\,cm.}^{1\%} = 266)$$

and N 1.52%; and it shows $R_f$ of 0.08 by thin layer chromatography on alumina-ethyl acetate system; according to said Japanese patent publication, leucomycin $A_2$ has a melting point of 142–144° C., maximum absorptions at 231 mμ

$$(E_{1\,cm.}^{1\%} = 158)$$

and 291 mμ ($\epsilon = 1.98 \times 10^4$) and N 1.10%, and it shows $R_f$ of 0.66 by thin layer chromatography on alumina-ethyl acetate system; leucomycin $B_1$ has a melting point of 214.5–216.5° C., a maximum absorption of 233 mμ

$$(E_{1\,cm.}^{1\%} = 320)$$

and N 1.99%; leucomycin $B_2$ has a melting point of 214–216° C., a maximum at 234 mμ

$$(E_{1\,cm.}^{1\%} = 306)$$

and N 1.75%; leucomycin $B_3$ has a melting point of 216–217° C., a maximum at 234 mμ

$$(E_{1\,cm.}^{1\%} = 311)$$

and N 2.05%; and leucomycin $B_4$ has a melting point of 221–223.8° C., a maximum at 233 mμ

$$(E_{1\,cm.}^{1\%} = 340)$$

and N 1.81%. Substance No. 466 has a melting point of 81–87° C., maximum absorption at 230–231 mμ

$$(E_{1\,cm.}^{1\%} = 369)$$

and 280 mμ

$$(E_{1\,cm.}^{1\%} = 132)$$

N 2.02%, and $[\alpha]_D^{22} = -82°$ (0.5% in ethanol) (cf. J. of Antibiotics, A, vol. 8, 1964–9167 (1955)). Spiramycin I has a melting point of 133–137° C., a maximum absorption at 232 mμ

$$(E_{1\,cm.}^{1\%} = 322)$$

and N 3.1%; spiramycin II has a melting point of 130–133° C., a maximum at 232 mμ

$$(E_{1\,cm.}^{1\%} = 307)$$

and N 3.1%; and spiramycin III has a melting point of 128–131° C., a maximum at 232 mμ

$$(E_{1\,cm.}^{1\%} = 327)$$

and N 3.0% (cf. Helv. Chim. Acta: vol. 39, 304–317 (1956)); tertiomycin A has a melting point of 202–204° C., a maximum at 233 mμ

$$(E_{1\,cm.}^{1\%} = 316)$$

N 2.49%, and $[\alpha]_D^{17} = -44°$ (1% in ethanol); and tertiomycin B has a melting point of 97–99° C., maximum absorptions at 231 mμ

$$(E_{1\,cm.}^{1\%} = 237)$$

and 278 mμ

$$(E_{1\,cm.}^{1\%} = 1.8)$$

N 1.62%, and $[\alpha]_D^{22} = -56°$ (1% in ethanol), (cf., J. of Antibiotics, A. vol. 8, 105–109 (1955) and 161–163 (1955)); miamycin has a melting point of 221–222° C. (decomposed), a maximum at 230 mμ, N. 2.28%, and $[\alpha]_D^{25} = -18°$ (1% in 0.02 N—HCl). (Cf. Antibiotics and Chemotherapy, vol. 7, 37–39 (1957).) On comparing these descriptions, it is clear that josamycin is a novel antibiotic.

This invention is further illustrated by the following examples. However, the invention is not limited to the examples but all processes based on the knowledge obtained by this invention are included in the process of this invention.

In the said examples, the abbreviations employed are conventional abbreviations; thus ml. signifies milliliters
ml./min. signifies milliliters per minute
mm. signifies millimeters
g. signifies grams
mg. signifies milligrams and
μg./ml. signifies micrograms per milliliter Percentages are by weight.

Example 1

One hundred (100) ml. of a culture medium consisting of water containing 1.5% soybean metal, 1% starch, 1% glucose, 0.3% sodium chloride, 0.1% dipotassium hydrogen phosphate, and 0.05% magnesium sulfate was placed in a 500 ml. flask and sterilized for 20 minutes at 120° C. After cooling, the culture medium was inoculated with strain A 205-$P_2$, *Streptomyces narbonensis* var. *josamyceticus*, and the strain was subjected to shaking culture at 27–29° C. and at 130 strokes per minute and 8 cm. amplitude. After 3 days of culture, the culture fluids in such 100 flasks were combined together and filtered to give 8700 ml. of culture filtrate. The pH of the filtrate was 6.4 and showed an inhibition zone of 25 mm. to *B. subtilis* (PCI 219 strain). The filtrate was extracted with 8700 ml. of ethyl acetate. The extract (7300 ml.) thus obtained was concentrated to 730 ml. under vacuum at temperatures lower than 50° C., 360 ml. of water added, and then concentrated hydrochloric acid added to adjust the pH to 2.0, whereby josamycin was transferred to the aqueous layer. After adjusting the pH of the aqueous layer to 7.5 by the addition of 1/10 N sodium hydroxide, josamycin was extracted with 180 ml. of ethyl acetate.

Josamycin was then transferred to 90 ml. of an aqueous solution at pH 2.0 and extracted again with 45 ml. of ethyl acetate as above processed. Ethyl acetate solution thus obtained was evaporated under reduced pressure to give a solidified product, which was dissolved in 5 ml. of benzene to remove impurities and the product, solidified from the benzene solution by evaporating under reduced pressure, was dissolved in a small amount of ethyl acetate and subjected to an alumina chromatography. That is, Brockman alumina (Merck) was treated with hydrochloric acid, sufficiently rinsed with water, and activated by heating for 5 hours at 150° C. Fifty (50) g. of thus treated alumina was filled in a glass tube of 1.6 cm. in diameter by using ethyl acetate. The above prepared ethyl acetate solution was added to the alumina column and the product was eluted with 200 ml. of ethyl acetate. The eluate thus obtained was concentrated under reduced pressure and the solid product thus obtained was dissolved in 5 ml. of benzene and 50 ml. of n-hexane added to give 0.18 g. of amorphous josamycin having a purity of above 90%. This powder inhibited *B. subtilis* PCI 219 at 0.31 μg./ml. Two intraperitoneal injections of 0.25 mg. of the powder protected mice (ddN, body weight 20 g.) from infection with *Staph. aureus* (Smith). Further, three intraperitoneal injections of 0.25 mg. of the powder protected mice (ddN, body weight 20 g.) from infection with *Diplococcus pneumoniae* III.

Example 2

The powder of josamycin (180 mg.) prepared as in Example 1 was dissolved in 1.5 to 2 ml. of benzene; on standing 89 mg. of needle crystals of josamycin separated out. By recrystallization with hot benzene, colorless needle crystals having the melting point of 108–113° C. (uncorrected) were obtained. Further, the crystals were dried under reduced pressure in an Abderhalden's apparatus (at 95° C. for 5 hours). Then the crystals were converted to white needle crystals having the melding point of 130–133° C. (uncorrected).

The crystals inhibited the growth of *B. subtilis* PCI 219 at the concentration of 0.19 μg./ml. and inhibited the growth of *Staph. aureus* FDA 209P at the concentration of 0.39 μg./ml. Mice (ddN) tolerated a single intravenous injection of 250 mg./kg. dose of these crystals.

Example 3

After sterilization for 20 minutes at 120° C., 50 liters of a culture medium consisting of water containing 1.5% soybean meal,
0.5% corn steep liquor,
1% starch,
1% glucose,
0.5% sodium chloride, and
0.3% calcium carbonate (pH adjusted to 7)

placed in a 100 liter stainless steel tank, was inoculated with the josamycin-producing strain of this invention and the cultivation was continued at 27–29° C. for 40 hours at 210 r.p.m. and at the aeration rate of 40–50 liters/min. When the culturing was stopped, the pH was 6.2 and the inhibition diameter to *B. subtilis* PCI 219 was 25 mm. by cylinder plate method. The culture broth was subjected to centrifugal separation to remove solid mass and to give 42 liters of culture filtrate. The filtrate was extracted with 42 liters of butyl acetate, and the extract was treated as in Example 1, and subjected to alumina chromatography to give 1.374 g. of a crude powder. The crude powder was recrystallized from toluene and dried as in Example 2 to give 479 mg. of crystals having the melting point of 130–133° C.

Example 4

In 50 ml. of ether was dissolved 500 mg. of the josamycin powder (90% in purity) obtained as in Example 1. To this solution, ether, saturated with tartaric acid, was added dropwise until no more precipitate was formed, and thus 450 mg. of precipitate was obtained after drying. A part of the precipitate was recrystallized from ether to give colorless needle crystals of the tartrate of josamycin. The melting point of the product was 125–127° C.

Example 5

The pH of 2000 ml. of the cultured broth obtained as in Example 1 was adjusted to 7.5 and the broth was extracted with 1000 ml. of ethyl acetate. The ethyl acetate layer was separated, concentrated under reduced pressure to 100 ml., 40 ml. of water added followed by adjusting the pH to 2.0 with the addition of hydrochloric acid to transfer the product to the aqueous layer, and the aqueous layer was separated, sodium hydroxide added to adjust the pH to 7.5, and then mixed with 50 ml. of ethyl acetate to transfer the product to the ethyl acetate layer. Thereupon, the ethyl acetate layer was mixed with 30 ml. of acidic water to transfer the product to the aqueous layer. The aqueous layer was separated, filtered with the addition to 0.5 g. of activated carbon, and the filtrate was freeze dried to give 210 mg. of slightly brown powder of josamycin hydrochloride of 40% purity.

Example 6

The pH of 40,000 ml. of cultured broth obtained as in Example 1 was adjusted to 3 with hydrochloric acid and the cultured broth was filtered with the addition of 800 g. of diatomaceous earth. The filtrate was, after adjusting the pH to 6.0 with sodium hydroxide, passed through a column (48 mm. in diameter) packed with 2,000 ml. of cation-exchange resin (Amberlite IRC–50 H-type) at a rate of about 50 ml./min. to adsorb josamycin on the resin. The passed solution from the resin did not show an inhibition zone to *B. subtilis* by the cylinder plate method.

After washing the resin by passing 30,000 ml. of distilled water therethrough, josamycin on the resin was eluted by passing 4,500 ml. of 0.6 M aqueous acetic acid-methyl alcohol (3:7 in volume ratio) at a flow rate of about 8 ml./min. The pH of the eluate was adjusted to 5.5 with sodium hydroxide, the eluate was concentrated under reduced pressure to 1,400 ml., and after adjusting the pH to 7.5 with sodium hydroxide, the solution was extracted with the addition of 1,000 ml. of ethyl acetate. The ethyl acetate layer was separated and concentrated under reduced pressure to form a solid matter, which was dissolved in benzene and n-hexane added, to give 1.42 g. of white powder after drying. The purity of josamycin in the powder was 60%.

Example 7

100 mg. of crystals of josamycin were suspended in 20 ml. of methanol-water (4:6 in volume ratio). N/10 aqueous hydrochloric acid solution was added to the above solution slowly with mechanical stirring until the pH of the solution became 5.03 and solid in the solution was completely dissolved. The solution thus obtained was freeze-dried to give an amorphous powder of hydrochloride of josamycin, melting at 139.5–141° C. by Fischer-Johns type melting point apparatus.

It is clear from the foregoing that the new antibiotics of the present invention are useful in combating, in animals, infections due to staphylococci, e.g. *Staphylococcus aureus* (Smith) and to other infection-producing microorganisms. Administration is intraperitoneal, suitable dosage ranging from about 12 to about 25 milligrams per kilogram of body weight (mouse); or oral, about 50 to about 100 milligrams per kilogram of body weight (mouse).

What is claimed is:

1. A process for producing josamycin, which comprises culturing *Streptomyces narbonensis* var. *josamyceticus* in a culture medium containing assimilable sources of carbon and nitrogen, under aerobic conditions, until substantial antibiotic activity is produced by said organism in said culture medium, and then recovering the so-produced josamycin from the fermentation broth.

2. A process for producing josamycin, which comprises culturing *Streptomyces narbonensis* var. *josamyceticus* in an aqueous nutrient containing assimilable sources of carbon, nitrogen and inorganic salts under aerobic conditions at a temperature of from about 25° C. to about 30° C. for a period of from 2 to 5 days, and then recovering the josamycin from the fermentation broth.

3. A process as claimed in claim 1, wherein the recovery of josamycin includes the step of extracting the antibiotic into a water immiscible organic solvent selected from the group consisting of butyl acetate, ethyl acteate, chloroform, methyl isobutyl ketone and butyl alcohol in which josamycin is more soluble than in water under neutral or weak-alkaline conditions.

4. A process as claimed in claim 1, wherein the recovery of the josamycin includes the step of adsorption on an adsorbent selected from the group consisting of activated carbon and ion-exchangers.

5. A process as claimed in claim 1, wherein the recovery of the josamycin includes the step of extracting the antibiotic from a cultivation product containing josamycin into a water-immiscible organic solvent selected from the group consisting of butyl acetate, ethyl acetate, chloroform, methyl isobutyl ketone and butyl alcohol in which josamycin is more soluble than in water under neutral or weak-alkaline conditions.

6. A process as claimed in claim 2, wherein the fermentation broth is filtered to remove the mycelium, the filtrate is adjusted to a pH of about 7.5 and extracted into a water-immiscible organic solvent selected from the group consisting of butyl acetate, ethyl acetate, chloroform, methyl isobutyl ketone and butyl alcohol in which josamycin is more soluble than in water, the organic solvent extract is extracted with dilute aqueous acid, the aqueous acid extract is extracted with the said water-immiscible organic solvent and the organic solvent extract is concentrated.

7. A process as claimed in claim 1, wherein the recovery of the josamycin includes the step of adsorption of the antibiotic on a weak-acidic ion-exchanger and elution with a solvent for the josamycin.

8. A process as claimed in claim 2, wherein the fermentation broth is filtered to remove the mycelium, the filtrate is adjusted to a pH of about 6; josamycin therein is adsorbed on a weak-acidic cation-exchanger and is eluted from the ion-exchanger with a solvent for the josamycin, the solvent is removed from the eluate, the residual fluid is adjusted to a pH of about 7.5, and josamycin is recovered from said fluid by extracting the antibiotic into a water immiscible organic solvent selected from the group consisting of butyl acetate, ethyl acetate, chloroform, methyl isobutyl ketone and butyl alcohol in which josamycin is more soluble than in water under neutral or weak-alkaline conditions.

9. A process as claimed in claim 1, wherein the purification of josamycin includes the step of recrystallization of crude josamycin with a solvent selected from the group consisting of benzene, toluene and xylene.

10. An antibiotic substance designated josamycin, effective in inhibiting the growth of gram positive bacteria, selected from the group consisting of basic substance and the acid addition salts thereof, said base having the following properties: colorless needle crystals; melting point of 130–133° C. (uncorr.); molecular weight of about 865, obtained from titration data; $pK'_a$ of 7.1 when titrated in aqueous methanol; specific rotation, $[\alpha]_D^{25}$ of $-70°$ (c.=1%, in ethanol); ultraviolet absorption maximum at 232 m$\mu$ $$(E_{1\,cm.}^{1\%} = 320)$$

in methanol, and at 232 m$\mu$ $$(E_{1\,cm.}^{1\%} = 325)$$

in a $\frac{1}{1000}$ N aqueous hydrochloric acid solution; infrared absorption bands, when mixed with potassium bromide, at 3480, 2960, 2930, 2880 (shoulder), 1734 1627, 1452, 1374, 1297, 1234, 1165, 1120, 1080, 1050, 1020, 995, 936, 916, 855, and 837 cm.$^{-1}$; easily soluble in acidic water, methanol, ethanol, chloroform, ethyl acetate, and acetone; soluble in benzene, ether and carbon tetrachloride; slightly soluble in water, petroleum ether, ligroin, and n-hexane; elemental analysis of C=60.63%, H=8.49%, N=1.77% and O=28.75%; and a calculated formula of $C_{40}H_{68}NO_{14}$.

11. A basic substance according to claim 10.

12. An acid addition salt of the base defined in claim 10.

13. A tartrate of the base defined in claim 10, said salt having a melting point of 125–127° C. (uncorr.).

14. A hydrochloride of the base defined in claim 10, said salt having a melting point of 139.5–141° C. (uncorr.).

No references cited.

JEROME D. GOLDBERG, Primary Examiner

U.S. Cl. X.R.

195—80